United States Patent [19]

Bunch

[11] Patent Number: 5,896,103

[45] Date of Patent: Apr. 20, 1999

[54] METHOD AND APARATUS FOR DYNAMICALLY CALIBRATING A RADAR RECEIVER

[75] Inventor: Brian P. Bunch, Peoria, Ariz.

[73] Assignee: Honeywell Inc., Minneapolis, Minn.

[21] Appl. No.: 08/730,431

[22] Filed: Oct. 15, 1996

[51] Int. Cl.⁶ .................................. G01S 7/34; G01S 7/40
[52] U.S. Cl. ..................................... 342/174; 342/92
[58] Field of Search ............................ 342/174, 165, 342/91, 92, 26; 367/98

[56] References Cited

U.S. PATENT DOCUMENTS 5,068,833  11/1991  Lipschutz ........................... 367/98

Primary Examiner—Daniel T. Pihulic
Attorney, Agent, or Firm—Brian C. Downs; Ronald E. Champion

[57] ABSTRACT

A wave-based detection system according to various aspects of the present invention analyzes signals in conjunction with a series of thresholds related to the anticipated input power of the incoming signals. The system implements a scheduled gain system to optimize the dynamic range according to the operating configuration of a transmitter and the characteristics of the receiver. The thresholds are correspondingly scaled using the scheduled gain. Because the thresholds are determined by an algorithm instead of a look up table, with the algorithm being based solely on the anticipated input power, the system uses significantly less memory and empirical data.

27 Claims, 7 Drawing Sheets

CONCEPT: NO GAIN SCHEDULING

METHOD AND APARATUS FOR DYNAMICALLY CALIBRATING A RADAR RECEIVER

BACKGROUND OF THE INVENTION

1. Field of the Invention

The present invention generally relates to radar systems, and more particularly, to methods and apparatuses for calibrating a radar receiver and processing radar signals reflected from a target.

2. Description of the Related Art

In World War II, radar systems using centimeter wavelengths were discovered to detect reflections from precipitation, such as rain and hail. Since this discovery, radar systems have developed into extremely useful tools for identifying and classifying weather systems, particularly in the 3 cm to 10 cm wavelength range. For example, a weather radar system is typically installed on an aircraft to identify the conditions within a weather system, such as a cloud, that the aircraft is approaching. Radar waves emitted from the aircraft's radar system reflect from precipitation in the cloud and return to the aircraft. The radar system detects and analyzes the reflected waves to identify the range and characteristics of the cloud. In particular, the power of the reflected signal is proportional to the cloud's reflectivity, which is in turn related to the amount of rainfall within the cloud. Consequently, by timing the delay between the pulse emission and detection and comparing the power of the reflected signal to a series of power thresholds, the range to and characteristics of the cloud may be established.

As the range to the target increases, however, the signal-to-noise ratio drops dramatically. Like any light waves, the intensity of a radar pulse fades in a manner proportional to the square of the distance propagated. Therefore, because reflected waves travel both to and from a target, the radar waves are attenuated in a manner proportional to the range of the target to the fourth power for a point target. For a target which completely fills the beam, the relationship is to the second power. For a target which partially fills the beams, the relationship lies between the second and fourth powers. The waves are further attenuated due to atmospheric loss and the like. As a result, the signal from distant targets is relatively weak, so that background noise and receiver generated noise, which occurs in every environment, tends to obscure the reflected signal. To extract useful information from distant target reflections, amplification and processing of the detected reflections are consequently necessary to compensate for the lower signal-to-noise ratio.

In a simple radar system configuration, detected signals are amplified according to a schedule. The radar receiver amplifies both the reflected signal and the noise, but because the reflected signal amplitude is greater than the amplitude of the noise, the amplification magnifies the difference between the signal and the noise, facilitating differentiation between the noise and the reflected signal. The gain is varied with time, according to a predetermined schedule, to take advantage of the known propagation rate of the radar pulse. After a radar pulse is emitted, the system begins to incrementally amplify the detected signals as a function of time. Because the radar pulse propagates at a substantially constant and known speed, and because the rate of attenuation is known, the level of amplification may be adjusted with time to counter the known attenuation of the reflected signals.

Typically, the gain is adjusted to maintain a threshold for the input power received from a target of a particular reflectivity at a constant level. For example, a cloud which is releasing 10 millimeters of rain per hour is known to have a particular reflectivity at a particular wavelength. The rate at which the signal attenuates with distance is also known, (based on an assumed beam-filling percentage) so the gain may be scheduled to counter the known rate of decay of the signal.

Signals received from the target are also filtered and analyzed for amplitude. The received signal is compared to a plurality of detection thresholds, each corresponding to a target of different reflectivity at the range of the target. If the amplitude of the reflected signal exceeds at least one of the detection thresholds, the relevant portion of the signal is treated as potentially relating to a relevant target.

The effectiveness of this system is limited, however, by the characteristics of radar detectors and the signals they detect. When the signal-to-noise ratio is high, the power output of the radar detector varies approximately linearly with respect to the power of the signal incident upon the antenna. As the signal-to-noise ratio decreases, however, the relationship becomes nonlinear, especially for signals received from low reflectivity targets or from very distant targets. Consequently, the constant detection thresholds and scheduled gain as described above become improperly calibrated for signals with low signal-to-noise ratios.

To provide the appropriate detection thresholds for signals with low signal-to-noise ratios, current systems adjust the detection thresholds to vary nonlinearly with respect to the power of the signal incident upon the antenna. Because the thresholds do not vary linearly, however, the thresholds are adjusted according to data tables based on empirical data. In other words, the radar system is tested in a particular configuration to assemble the relevant data as a function of time based on the hardware configuration, operating parameters, target reflectively, gain, and detection threshold. The data is then stored in a local memory for access by the radar receiver to update the gain and detection thresholds as a function of time. Thus, after a pulse is emitted, the radar detector regularly updates the system parameters by checking the appropriate table determined by the configuration of the radar system, the type of target, and the time elapsed since the pulse emission. Based on these variables, the table provides an empirically detected gain for amplifying incoming signals and a set of detection thresholds for classifying the intensity of incoming detected signals.

Although such conventional systems may be functional, creating the data table presents a time-consuming and demanding task. Empirical data for the threshold is developed for each and every time interval and adjustment of the gain. A different set of data is developed for each target of a certain reflectivity having a corresponding threshold. In addition, the data for the gain schedule and all of the thresholds correspond to only a single configuration of the radar system, such as a particular transmitter antenna and pulse power. Consequently, because the schedule for the adjustments to the gain and the threshold vary according to the hardware and configuration of the transmitter and antenna, data tables are compiled for each of the different anticipated configurations. For example, a radar system configurable with two different antennae has two different gain schedules and sets of detection threshold data tables, because the power of the pulse incident upon the target varies according to the antenna being used.

Furthermore, simply changing various operating parameters often requires new data tables. For example, changing the pulse width of the emitted pulse changes the power of the return signal from a target. As a result, the original detection threshold data no longer applies, and the system performance degrades.

As the number of possible configurations and detection thresholds increases, the number of tables that are developed and stored in the radar system also increases. This represents not only more experimental time generating the empirical data, but greater storage requirements for the data tables in the radar detector. Because such radar systems are typically used in conjunction with compact avionics systems, the addition of further memory to accommodate additional data tables not only increases the cost of the radar detector, but also presents the problem of finding sufficient space for the added memory components which must necessarily be added.

SUMMARY OF THE INVENTION

A radar system according to various aspects of the present invention comprises a radar system, wherein the radar receiver adjusts a detection threshold according to the gain schedule, as well as the input signal. A raw detection threshold is established corresponding to the expected input power, i.e, the input power of a target of a selected reflectivity at a particular range. The radar receiver then scales the raw detection threshold using the gain scheduled for the particular range. The resulting scaled threshold is then used to detect and classify an incoming signal.

In accordance with a preferred aspect of the invention, the raw threshold is based only on the expected input power, thus compensating only for the nonlinear characteristics. The scheduled gain, on the other hand, is independently adapted to provide the appropriate dynamic range for the receiver based on the power of the emitted pulse and the time elapsed. Thus, the gain schedule and the raw threshold are generated individually, thereby reducing the need for empirical data tables.

Thus, a system according to various aspects of the invention includes the advantages of greater versatility and reduced hardware requirements. Because the data tables are reduced, the storage requirements of the system are minimized. In addition, the time required to generate the empirical data is similarly eliminated. Further, the configuration of the system is more versatile because modification of the antenna or operating characteristics only affects the gain schedule, which is relatively easily modified.

These and other advantages of a system according to various aspects of the present invention will be apparent to those skilled in the art upon reading and understanding the following detailed description with reference to the accompanying figures.

BRIEF DESCRIPTION OF THE DRAWING

The subject matter of the invention is particularly pointed out and distinctly claimed in the concluding portion of the specification. Preferred embodiments of the invention, however, both as to organization and method of operation, may best be understood by reference to the following description taken in conjunction with the claims and the accompanying drawing figures, in which like numerals denote like elements and:

DETAILED DESCRIPTION OF EXEMPLARY EMBODIMENTS

Figure 1:
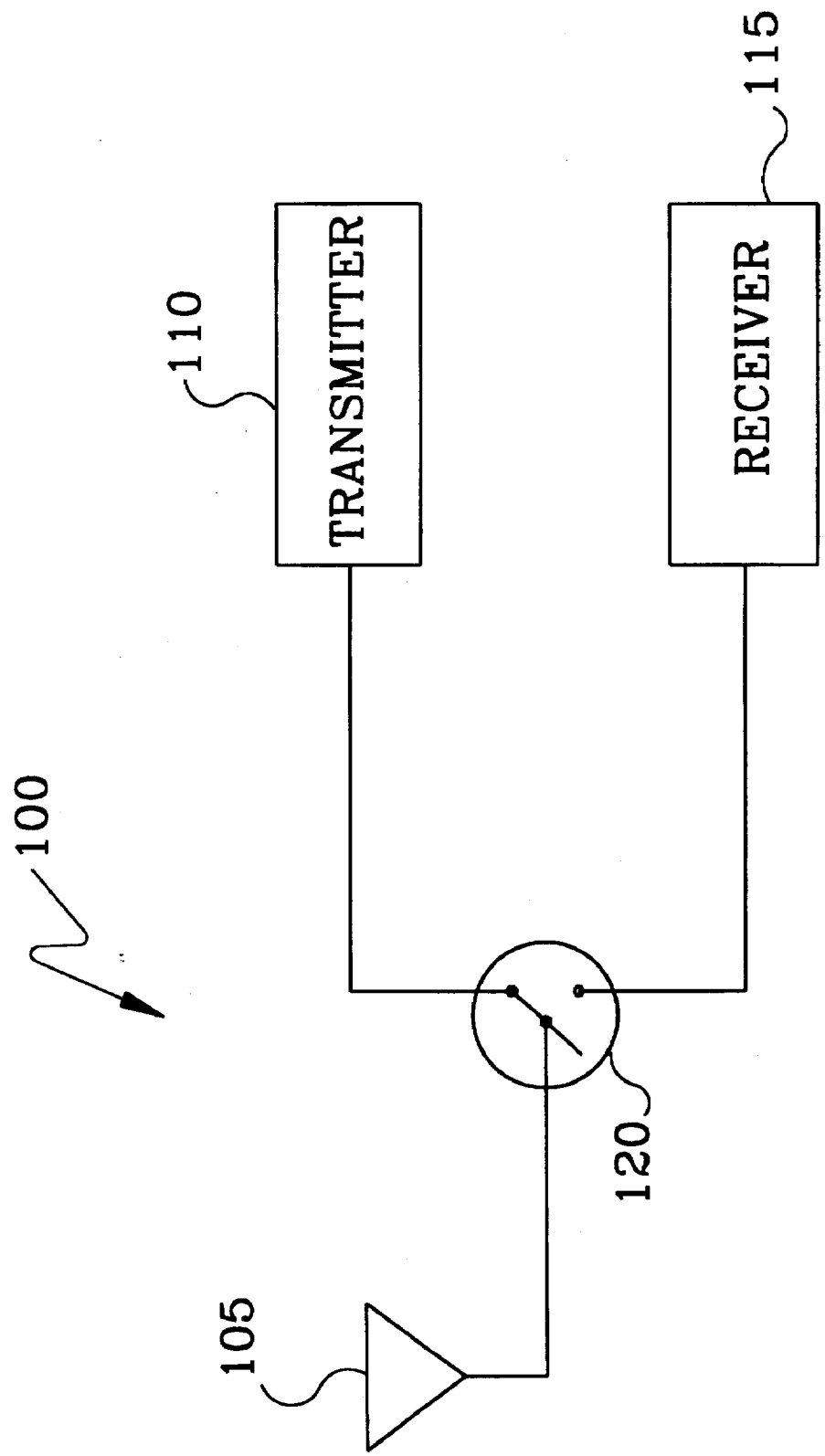
FIG. 1 is a general block diagram of a radar system according to various aspects the present invention.

Referring now to FIG. 1, a radar system 100 according to various aspects of the present invention comprises: an antenna 105; a transmitter 110 connected to antenna 105 for generating radar signals and providing them to transducer 105; and a receiver 115 for receiving radar signals from transducer 105 for processing and analysis. Transducer 105 suitably comprises any transducer, for example an antenna, an electromechanical transducer (such as may be used in some applications) or other device. In accordance with a particularly preferred aspect of the present invention, transducer 105 comprises an antenna for radar applications and may be configured for any suitable size, effective aperture area, beamwidths, scan rate and coverage for the particular application. In accordance with this preferred embodiment, antenna 105 is configured as a weather radar antenna compatible with a microwave transmitter 110 and receiver 115, though various aspects of the present invention may be used in innumerable other applications. For example, system 100 may be suitable in connection with surface search radar, fire control radar, seismic search systems sonar and the like.

Antenna 105 is suitably configured as a mechanically scanned horn-fed reflector operating in conjunction with a servo motor and rotating pedestal, or as a mechanically or electrically scanned phased array antenna. In addition, antenna 105 suitably operates in conjunction with both transmitter 110 for emitting radar waves and receiver 115 for detecting reflected waves. Alternatively, antenna 105 may include multiple antennae for either or both of transmitter 110 and receiver 115. Further, radar system 100 according to various aspects of the present invention is suitably reconfigurable for different sizes and types of antennas. For example, in accordance with various aspects of the present invention, radar system 100 suitably operates in conjunction with antenna 105 of various configurations such as twelve-inch, fifteen-inch, eighteen-inch, twenty-one-inch, twenty-four-inch, and thirty-inch round reflector antennae, as well as, for example, elliptical antennae such as an elliptical twelve-by-eighteen-inch reflector antenna.

Antenna 105 is selectively connected to both transmitter 110 and receiver 115 via a duplexer 120. Transmitter 110 is suitably configured to generate microwave signals and provide them to antenna 105 for emission. Transmitter 110 suitably comprises a conventional high power, low duty ratio pulsed microwave radar transmitter. For example, transmitter 110 suitably comprises either a tube-type transmitter or a solid-state transmitter according to the particular application of the radar. Alternatively, transmitter 110 may comprise any radar transmitter utilizing signals of any wavelength, wave shape, power, or duration.

Receiver 115 is selectively connected to antenna 105 through duplexer 120 to receive detected radar waves emitted by antenna 105 and reflected from a target, such as a cloud. It should be noted, however, that the principles of the present invention may be applied to any sort of ranging and tracking system, not merely a weather radar system. In this context, the radar wave may comprise any signal, such as electrical, RF, optical or even smoke signals. Receiver 115 is suitably configured to amplify weak reflected waves for detection, processing, and display. Preferably, receiver 115 is configured to add minimal noise to the received signal and provide accurate processing and detection of reflected signals. Receiver 115 is further configured to provide any signal processing necessary to provide useful information to the operator, including filtration, amplification, pulse compression, detection, analysis, clutter rejection, and display integration.

Figure 2:
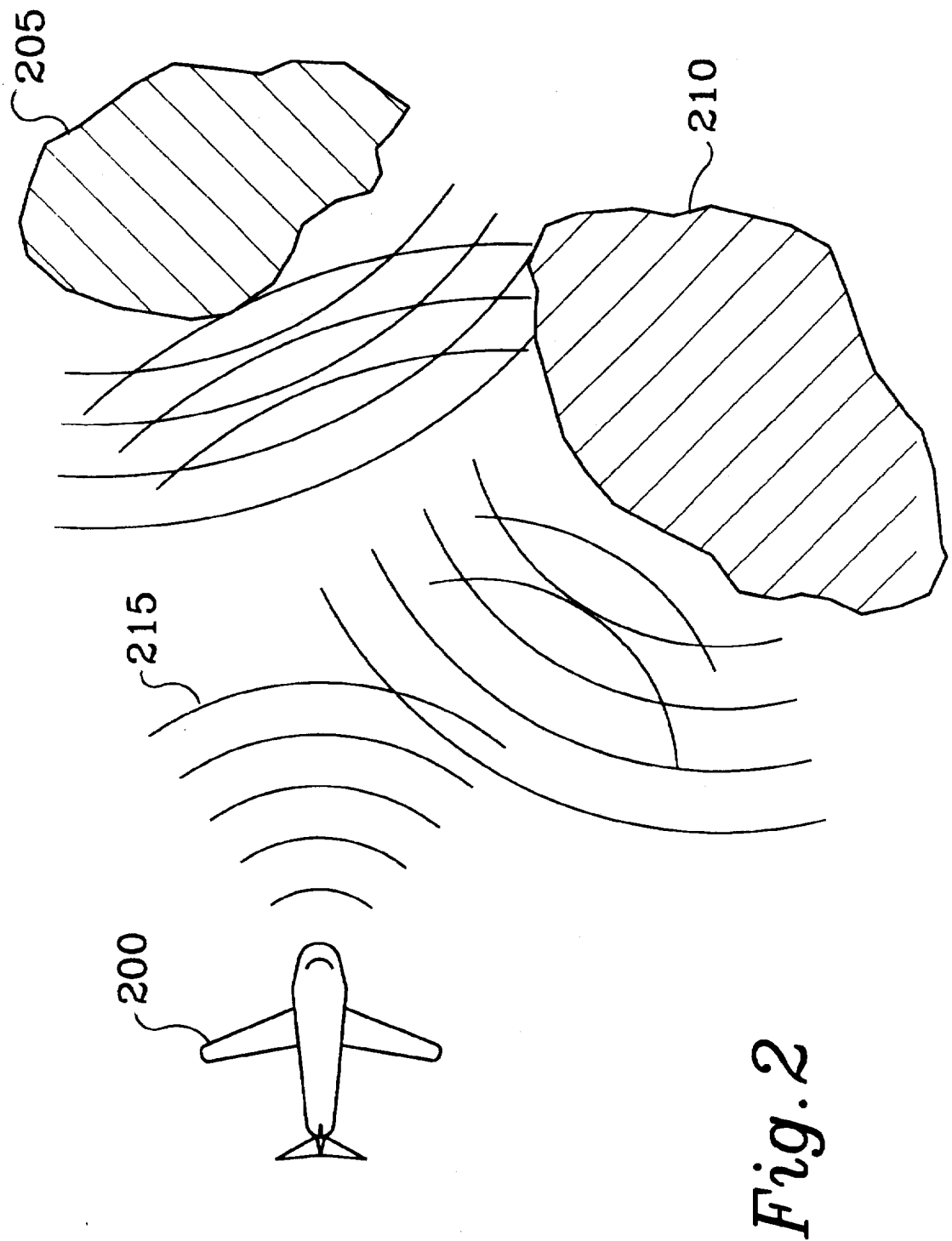
FIG. 2 is an illustration of radar waves propagating towards and reflecting from targets.

Referring now to FIG. 2, a radar system 100 according to a preferred aspect of the present invention may be used in conjunction with an aircraft 200 to identify and differentiate between various weather systems, particularly respective clouds 205, 210. Briefly, transmitter 110 drives antenna 105 to generate respective pulses 215 of microwave radiation, which propagate from antenna 105 towards clouds 205, 210 at the speed of light in the atmosphere. As the incident waves encounter droplets in clouds 205, 210, a portion of the energy is absorbed or transmitted by clouds 205, 210, while another portion is reflected back towards aircraft 200. The magnitude of the reflected fraction is affected by the size and density of the droplets within clouds 205, 210. Consequently, in conjunction with empirical observations relating to such reflections, the density of the moisture, and therefore the severity of the conditions within and near clouds 205, 210, may be estimated based on the magnitude of the reflected portion of pulse 21 5. Thus, when the reflected portion of pulse 215 propagates back toward aircraft 200, the reflected wave generates electrical signals in antenna 105 which is detected by receiver 115.

Figure 3:
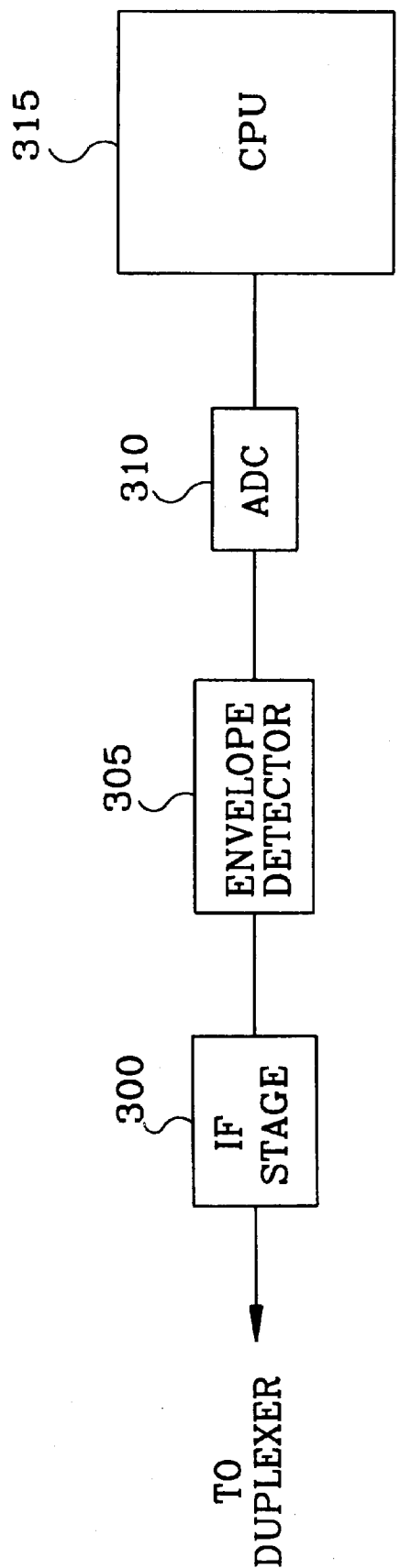
FIG. 3 is a block diagram of the radar receiver of FIG. 1.

Receiver 115 amplifies, filters, and analyzes the incoming signals. In this manner, such a signal may be any suitable characteristic of the wave incoming from the target. While typically such signal will comprise a power amplitude, other characteristics may also be advantageously detected. In accordance with various aspects of the present invention, and referring now to FIG. 3, a suitable radar receiver 115 accordingly preferably comprises: an intermediate frequency (IF) stage 300; an envelope detector 305; an analog-to-digital converter (ADC) 310; and a central processing unit (CPU) 315. The IF stage 300 comprises any suitable circuit for converting the radio frequency (RF) signals received from antenna 105 into an intermediate frequency. For example, the IF stage 300 suitably includes a balanced mixer for converting from RF to IF signals. The IF stage 300 converts the RF signal to any suitable frequency, for example, 30 or 60 MHz. The IF stage 300 also preferably includes a low-noise amplifier for amplifying weak signals from the reflected radar waves. The amplifier's gain is variable, for example according to signals received from CPU 315. In addition, the IF stage 300 suitably performs any other desired preliminary processing of the incoming signals, such as filtration and pulse compression.

Signals from the IF stage 300 are transmitted to envelope detector 305 for detection of signals based on reflected radar waves. Envelope detector 305 comprises any suitable envelope detector 305 for identifying signals based on reflected radar waves, and may use any suitable criteria. For example, envelope detector 305 may be configured as either a linear detector, such as a semiconductor diode detector, or a logarithmic detector, such as a series of cascaded amplifiers. Detection criteria may be based on amplitude, phase and amplitude, in-phase and quadrature components, or any other suitable signal characteristics.

When a signal is detected by envelope detector 305, the signal is transmitted to CPU 315 via ADC 310. ADC 310 converts the analog signals received from envelope detector 305 into digital signals. Preferably, ADC 310 comprises any suitable ADC having sufficient range and reliability for operations in the environment of radar system 100.

Figure 4:
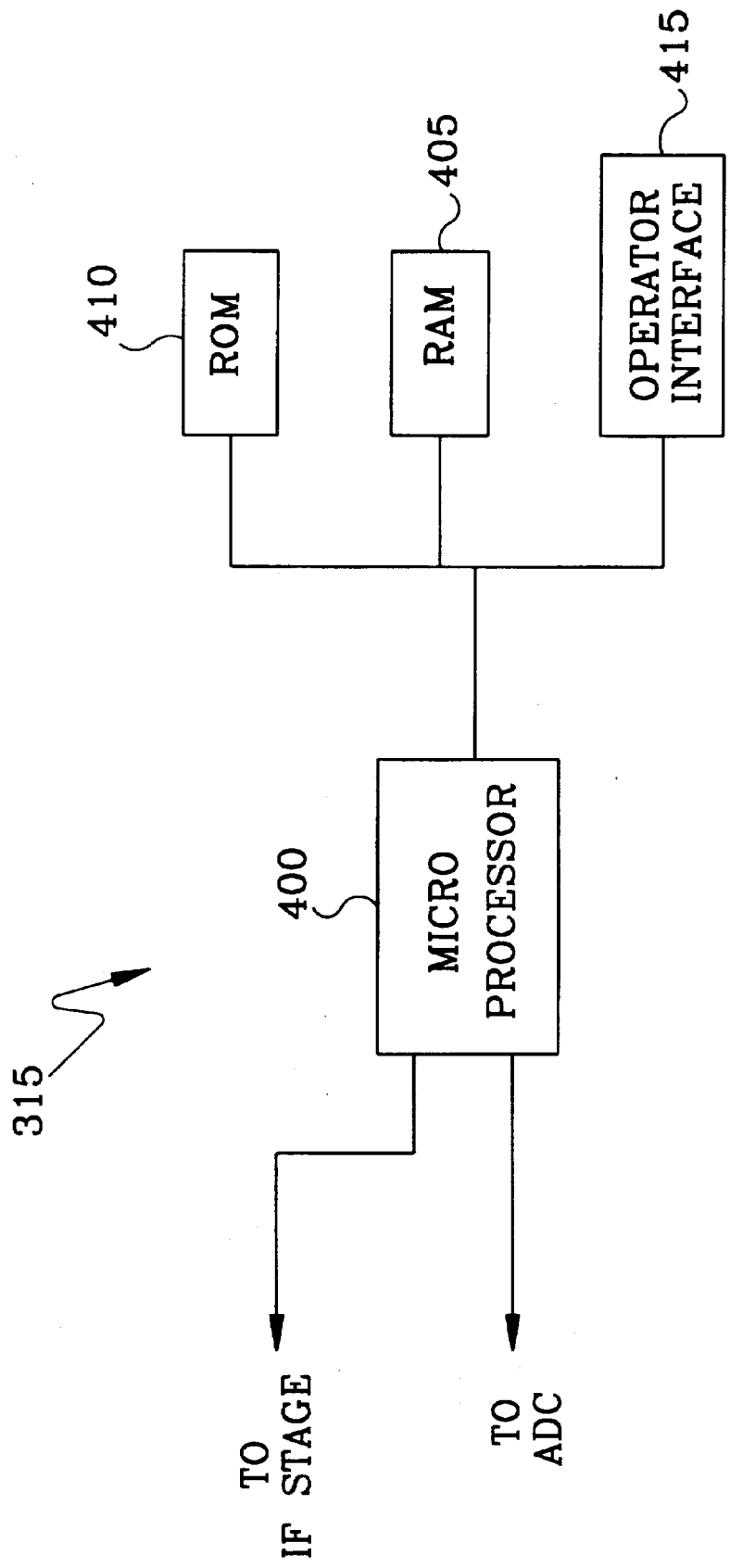
FIG. 4 is a block diagram of the CPU of FIG. 3.

Digital signals corresponding to the analog signals transmitted by envelope detector 305 are received and processed by CPU 315. CPU 315 performs the main processing tasks for analyzing the signals received by radar receiver 115, delivering useful information to the operator, and controlling the variable gain of the IF stage 300. Referring to FIG. 4, CPU 315 suitably comprises a processing system including, for example, a microprocessor 400, a random access memory (RAM) 405, a read-only memory (ROM) 410, and an operator interface 415. Microprocessor 400 comprises any suitable microprocessor for identifying and classifying the incoming signals. The primary programming for microprocessor 400 is suitably stored in ROM 410, and RAM 405 provides general memory facilities for storage of and access to data and programs by microprocessor 400 during operation. Operator interface 415 suitably comprises an interface for driving any suitable equipment or machinery suitable for providing information to the operator or other components of craft 200, such as a cathode-ray tube or an audible alarm.

It should be noted that this configuration of CPU 315 is provided herein as an example, and does not attempt to describe all possible configurations of suitable CPUs 315. To the contrary, any number of acceptable CPU configurations may be developed to implement CPU 315 tasks to be performed in conjunction with radar system 100 according to various aspects of the present invention.

Exemplary CPU 315 suitably performs several functions, including variably controlling the gain of the IF stage 300 and processing the signal, such as by establishing raw detection threshold values, calculating scaled threshold values, adjusting the scaled threshold values for time invariant factors, and comparing the signals from envelope detector 305 to the adjusted threshold values. In particular, CPU 315 adjusts the gain of the IF stage 300 according to, for example, a suitable schedule, which may be stored in ROM 410 or RAM 405. In accordance with a preferred aspect of the present invention, the schedule is suitably configured to increase the gain of the IF stage 300 as a function of time elapsed following emission of pulse 215 by radar transmitter 110 to adjust the dynamic range of radar receiver 115 as the magnitude of the reflected signals diminishes with range.

In accordance with a preferred embodiment of the present invention, however, the gain schedule is not configured to maintain any particular input power level or threshold value at a uniform level with time, but merely to maximize the dynamic range of radar receiver 115 as the magnitude of the reflected signals decreases over time. The gain is suitably adjusted in 0.25 dB increments at the appropriate times, or may be adjusted at regular time intervals to optimize the dynamic range of receiver 115.

The magnitude of the gain at any particular time is suitably based on the time elapsed since the emission of pulse 215 and the operating configuration of transmitter 110 and antenna 105. The configuration of antenna 105 and transmitter 110, such as the type of antenna, pulse width, and pulse type, affect the power of pulse 215 emitted, and thus correspondingly affect the power of the reflected waves. Thus, in accordance with a preferred aspect of the present invention, to establish the appropriate gain schedule, microprocessor 400 determines the operating configuration of transmitter 110 and dish, for example, by accessing a particular memory location or polling the devices, to determine the relevant characteristics of emitted pulse 215, for example, the power of pulse 215. Based on the operating configuration, microprocessor 400 establishes the appropriate gain schedule to optimize the dynamic range of receiver 115. Preferably, CPU 315 adjusts the gain of the IF stage 300 such that the maximum expected input power, i.e., the reflected power that would be returned by a target having the maximum expected reflectivity, is amplified to slightly less than the maximum output of the IF stage 300.

For example, microprocessor 400 may access RAM 405 or ROM 410 to retrieve one of several predetermined gain schedules based on various alternative operating configurations. In the preferred embodiment, however, microprocessor 400 calculates an appropriate gain schedule based on the operating configuration. In this, the term "calculate" refers to determining the gain schedule without reference to a look-up table. Because microprocessor 400 may establish the power delivered to the target using the operating configuration information, microprocessor 400 may calculate the expected input power for a target having the maximum anticipated reflectivity at varying ranges and generate an appropriate gain schedule.

CPU 315 also suitably provides raw threshold values for analyzing signals received from envelope detector 305 via ADC 310. In particular, CPU 315 is suitably configured to establish various raw detection threshold values for targets of varying reflectivities at varying ranges based on the input power of the reflected wave at antenna 105. For example, CPU 315 may determine the proper raw threshold values by calculating each threshold based on the relevant expected input power. In this manner the raw threshold can be determined assuming that receiver 115 is an ideal unlimited dynamic range receiver. Alternatively, ROM 410 or RAM 405 of CPU 315 may include a table of raw threshold values corresponding to particular input power values. Consequently, based on an expected input power level, microprocessor 400 suitably determines the proper threshold by consulting the particular table stored therein. As such tables are readily obtainable by those skilled in the art, the description of such is not necessary for an understanding of preferred embodiments of the present invention. Because the relationship between the input power and the appropriate threshold is non-linear, especially for low signal-to-noise ratio situations, providing a table may be preferable for many applications where processing power is more costly than the relatively little memory required for such a look up table. It should be noted, however, that the table maybe used regardless of operating configuration; only one table is necessary for all of the potential gain schedules and operating configurations.

In accordance with various aspects of the present invention, CPU 315 is further configured to scale the raw threshold values based on the gain. In particular, microprocessor 400 is configured to adjust each raw threshold value according to the scheduled gain of the IF stage 300 to generate a scaled threshold value. Thus, each threshold value is automatically recalculated to correspond to the gain of the IF stage 300, regardless of the gain schedule implemented.

Microprocessor 400 is further suitably configured to adjust the scaled threshold values for time invariant factors that may be required to refine the threshold values. For example, radar receiver 115 may include inherent non-linearities that do not vary with time, for which the threshold values may be corrected after scaling.

Figure 5:
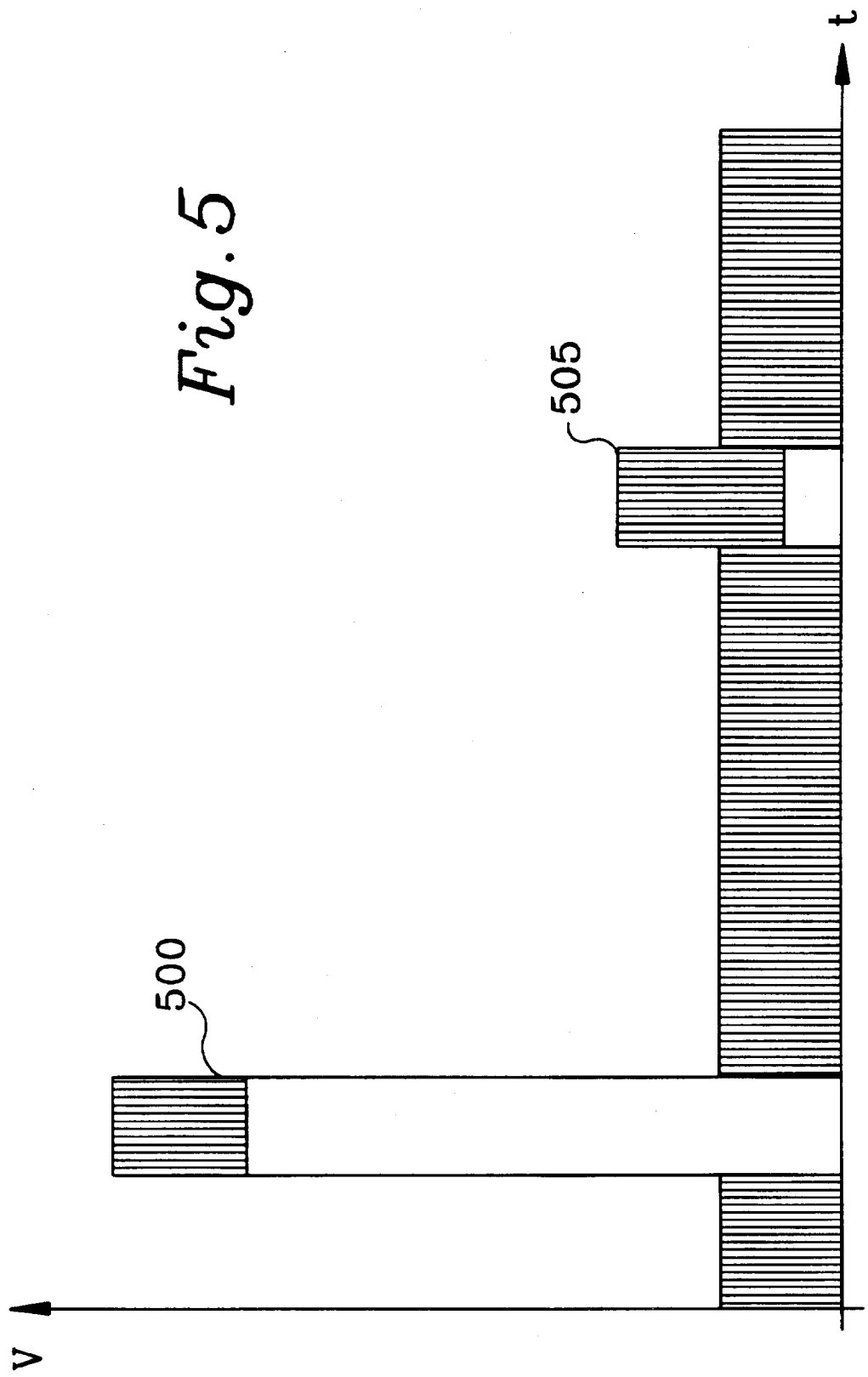
FIG. 5 is a graph depicting the magnitude of a signal refined from a target and received by a receiver as a function of time.

As described above, radar signals generated by radar transmitter 110 reflect from an object, such as clouds 205 and/or 210, and return to radar system 100 where they are detected by antenna 105. Referring now to FIG. 5, signals reflected from nearby objects return soon after emission of radar pulse 215 and cause antenna 105 to generate very strong signals 500. Signals 505 reflected from distant objects, however, return much later and generate relatively low level signals in antenna 105 having a relatively law signal-to-noise ratio.

The electrical signals corresponding to the detected waves generated in antenna 105 are transmitted to the IF stage 300 of radar receiver 115. Using the gain schedule and a timer associated with CPU 315, microprocessor 400 periodically adjusts the gain of the IF stage 300 to optimize the dynamic range of receiver 115. Thus, in the time interval immediately after the emission of pulse 215, the gain of the amplifier is very low so that strong signals reflected from nearby targets do not exceed the peak capacity of receiver 115. In the following time intervals, however, microprocessor 400 increases the gain of the IF stage 300 in accordance with the gain schedule to offset the attenuation of the signal.

With each adjustment of the gain, CPU 315 also suitably establishes and adjusts the appropriate threshold values. For example, using the operating configuration and the elapsed time information, microprocessor 400 may determine the expected input power likely to be received from targets of varying reflectivity, such as those associated with the various thresholds. After calculating each of the relevant input power levels, CPU 315 suitably generates the corresponding raw threshold values, for example by calculation or reference to a table. CPU 315 then scales the raw threshold values according to the current gain, and any time-invariant correction factors are then used to adjust the scaled threshold values.

The amplified signals from the IF stage 300 are transmitted to envelope detector 305 and then to CPU 315 via ADC 310. The signals received from ADC 310 are compared to the corrected, scaled threshold values determined by CPU 315. If the signals exceed any of the thresholds, the highest threshold exceeded is suitably noted. The signals are then processed according to various processing techniques, such as to implement clutter rejection and provision to operator interface 415.

Figure 6A:
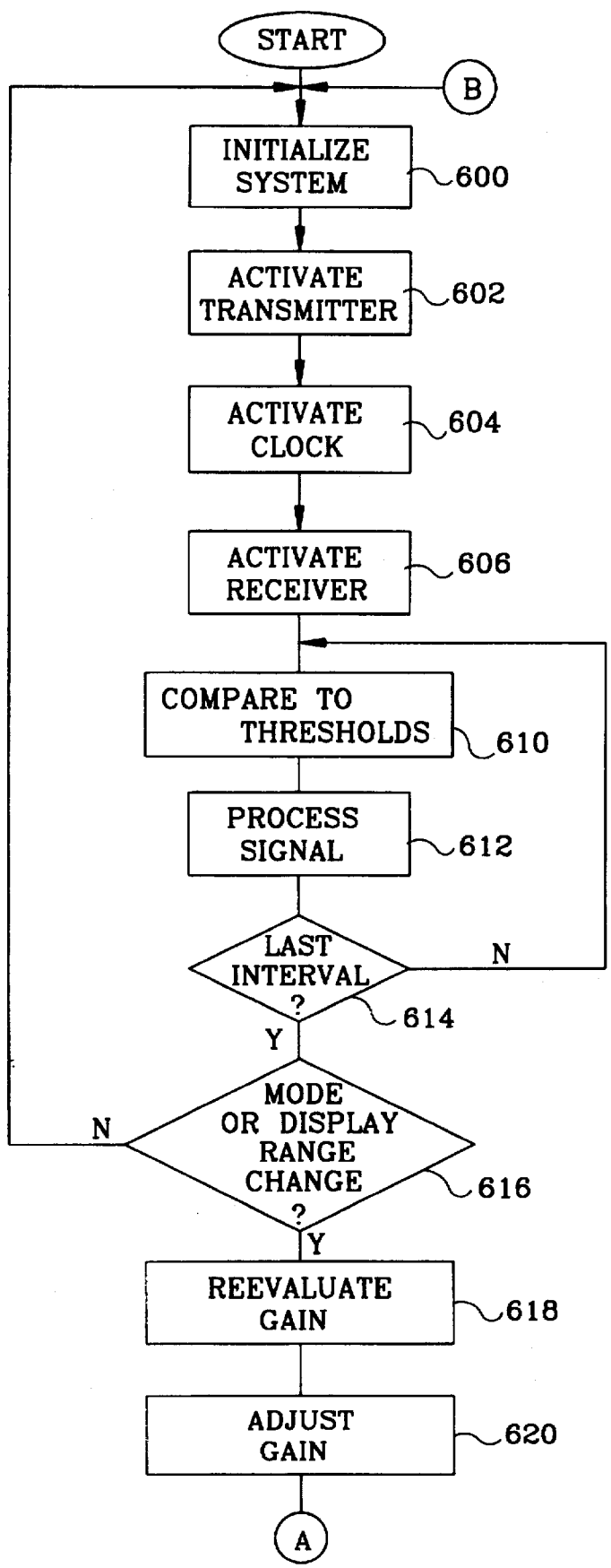
FIGS. 6A–B are flow charts of the operation of the radar system of FIG. 1.
Figure 6B:
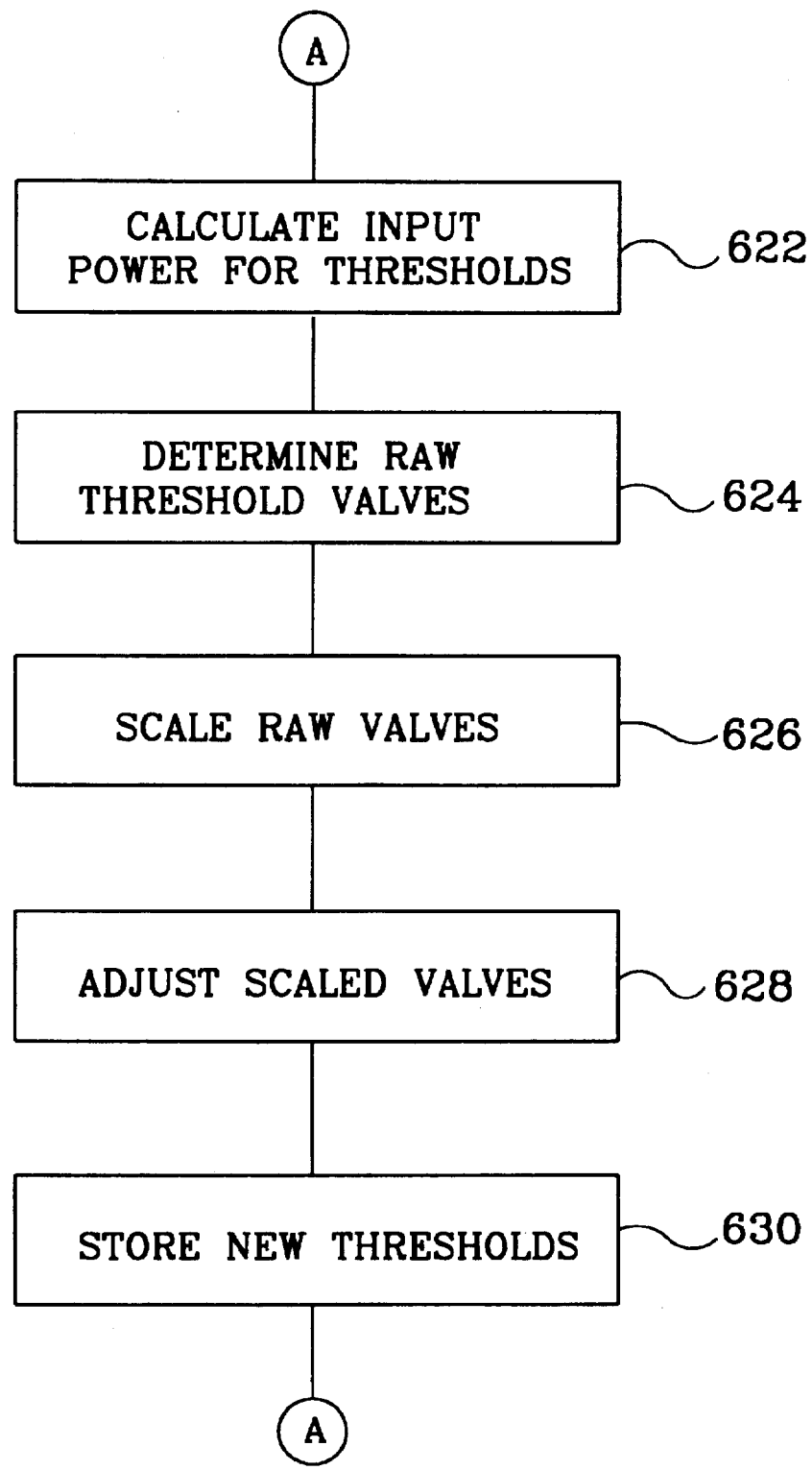

Referring now to FIGS. 6A–B, the operation of a radar system 100 according to various aspects of the present invention is initialized to prepare the system for operation (step 600). The initialization sets the gain of the IF stage 300 and the threshold values to any appropriate initial states, and connects transmitter 110 to antenna 105 and disconnects receiver 115. After initialization, transmitter 110 is activated (step 602), which emits a pulse 215 via antenna 105. As pulse 215 is generated, CPU 315 activates a clock associated with CPU 315 (step 604). Transmitter 110 is disconnected from antenna 105 and receiver 115 is connected (step 606).

Receiver 115 begins to monitor signals received from antenna 105 and the timer, for example using an interrupt or component polling protocol. As the relevant signal is detected by envelope detector 305, the signal is transmitted to CPU 315 via ADC 310. Microprocessor 400 accesses the memory for the corrected and scaled threshold values to determine whether the signal exceeds any of the thresholds (step 610) and, if so, classifies the signal based on the highest threshold exceeded. The signal is then further analyzed and, if appropriate, provided to the operator or other components of the system via operator interface 415 (step 61 2).

When the timer indicates the end of a time interval (step 614), CPU 315 determines whether this was the last time interval to be processed for the current transmission. If so, the CPU then determines if a mode or display range change has been requested (step 616). If not, the process repeats to initiate another pulse. Otherwise, CPU 315 suitably recalculates the appropriate gain of the IF stage 300 as of the beginning of the new transmission (step 618). CPU 315 then adjusts the gain of the IF stage 300 (step 620), and calculates the input power at antenna 105 that would be associated with a reflection from each of the relevant target reflectivities at the proper range for each time interval (step 622).

When the anticipated input power level for each relevant target reflectivity is determined, CPU 315 determines the corresponding raw threshold values (step 624). For example, CPU 315 may consult a table in memory containing raw threshold values corresponding to various input levels, or it may calculate the raw threshold values based on the input power. CPU 315 then adjusts each of the raw threshold values using the same gain value as used for adjusting the IF stage 300 (step 626). Each of the scaled threshold values is then suitably corrected for time-invariant irregularities, such as nonlinearities induced by receiver 115 hardware (step 628). These values are then stored until the next mode or display range change (step 630), at which point they are recalculated. The system then continues to transmit pulses and monitor the incoming signals.

A radar system 100 according to various aspects of the present invention provides an advantageous system for controlling the gain and establishing the detection thresholds of radar receiver 115. In particular, radar receiver 115 requires less empirical data to operate and less memory for storing data tables. The need for empirical data is eliminated or greatly reduced, because the appropriate thresholds are not determined as a function of time, operating configuration, and gain, but are only affected by the anticipated input power at the relevant time period. The result is a significantly smaller look up table for the input power-to-raw threshold conversion. Scaling the raw threshold according to the current gain, however, ensures that the gain and the thresholds used by CPU 315 are compatible. Furthermore, a radar system 100 according to various aspects of the present invention exhibits improved versatility, because the system can operate in conjunction with any antenna and operating characteristics. The operating configuration need only be supplied to microprocessor 400, with no need for more empirical data or look up tables.

While the principles of the invention have now been made clear in illustrative embodiments, there will be immediately obvious to those skilled in the art many modifications of structure, arrangements, proportions, the elements, materials and components, used in the practice of the invention which are particularly adapted for a specific environment and operating requirements without departing from those principles.

I claim:

1. A radar receiver for detecting a received signal due to a target, comprising:
    an amplifier configured to generate amplified signals corresponding to the received signal, wherein said amplified signals are amplified according a variable gain value;
    a variable gain controller connected to said amplifier, wherein said variable gain value of said amplifier is responsive to said variable gain controller, and wherein said variable gain controller is configured to calculate an anticipated magnitude of the target portion of the received signal and adjust said variable gain value of the amplifier according to said calculated anticipated magnitude; and
    a signal processor responsive to said amplifier and said variable gain controller, wherein said signal processor is configured to determine a raw threshold value according to said anticipated magnitude of the target portion of the received signal in conjunction with an algorithm, scale said raw threshold value as a function of said variable gain value, and compare said received signal to said raw threshold value.

2. The receiver of claim 1, wherein said variable gain controller and said signal processor are integrated into the same component.

3. The receiver of claim 2, wherein said same component comprises a microprocessor.

4. The receiver of claim 1, wherein said signal processor is configured to determine said raw threshold value according to said anticipated magnitude of the target portion of the received signal using a lookup table.

5. The receiver of claim 1, wherein said signal processor is configured to determine a plurality of raw threshold values according to a plurality of possible anticipated magnitudes of the target portion of the received signal, wherein said plurality of possible anticipated magnitudes corresponds to possible reflectivities of the target.

6. The receiver of claim 1, wherein said signal processor is further configured to change said scaled threshold value in accordance with a time-invariant correction factor.

7. The receiver of claim 1, wherein said variable gain controller adjusts said variable gain value of said amplifier according to said calculated anticipated magnitude in conjunction with a predetermined gain schedule.

8. The receiver of claim 1, wherein said variable gain controller adjusts said variable gain value of said amplifier according to said calculated anticipated magnitude in conjunction with a mathematical algorithm.

9. The receiver of claim 1, wherein said variable gain controller adjusts said variable gain value of said amplifier only to optimize a dynamic range of the receiver according to said calculated anticipated magnitude.

10. A method of identifying a target portion of a signal corresponding to a reflective target in a reflected radar wave signal, comprising the steps of:
    amplifying the reflected radar wave signal according to a gain value, wherein said gain value varies as a function of time;
    determining a threshold value corresponding to an anticipated magnitude of the target portion of the reflected radar wave signal as a function of time, wherein determining said threshold value includes calculating said threshold of said anticipated magnitude of the target portion of the reflected radar wave signal in conjunction with an algorithm;
    scaling said threshold value according to said gain value; and
    comparing said amplified reflected wave signal to said scaled threshold value.

11. The method of claim 10, wherein said step of determining a threshold value includes the step of determining said threshold value as a function of said anticipated magnitude of the target portion of the reflected wave signal using a lookup table.

12. The method of claim 10, wherein said step of determining a threshold value includes determining a plurality of threshold values according to a plurality of possible anticipated magnitudes of the target portion of the reflected wave signal, wherein said plurality of possible anticipated magnitudes corresponds to possible reflectivities of the target.

13. The method of claim 10, further comprising the step of changing said scaled threshold value in accordance with a time-invariant correction factor.

14. A target detection system for detecting a target reflective of waves, comprising:

a transducer configured to transform waves into signals and signals into waves;

a transmitter connected to the transducer and configured to provide signals to said transducer to generate radar waves via said transducer incident upon the target; and a receiver connected to the transducer and configured to detect said waves reflected from the target, including:
an amplifier connected to the transducer and configured to generate signals corresponding to said detected reflected waves, wherein said signals are amplified according to a variable gain value which varies as a function of time;
a signal processing system responsive to the amplifier and configured to compare said signals to a threshold, wherein said threshold is scaled as a function of said variable gain value; and
said signal processing system is configured to calculate said threshold as a function of an anticipated magnitude of said waves reflected from the target in conjunction with an algorithm.

15. The receiver of claim 12, wherein said signal processing system is configured to determine said threshold using a lookup table.

16. The receiver of claim 12, wherein said signal processing system is configured to determine a plurality of threshold values according to a plurality of possible anticipated magnitudes of said waves reflected from the target, wherein said plurality of possible anticipated magnitudes corresponds to possible reflectivities of the target.

17. The receiver of claim 12, wherein said signal processing system is further configured to change said scaled threshold in accordance with a time-invariant correction factor.

18. The receiver of claim 12, wherein said variable gain value varies according to a calculated anticipated magnitude of the waves reflected from the target in conjunction with a predetermined gain schedule.

19. The receiver of claim 12, wherein said variable gain value of said amplifier varies according to a calculated anticipated magnitude of the waves reflected from the target in conjunction with a mathematical algorithm.

20. The receiver of claim 12, wherein said variable gain value of said amplifier varies only to optimize a dynamic range of the receiver according to a calculated anticipated magnitude of the waves reflected from the target.

21. The receiver of claim 12, wherein said variable gain controller and said signal processor are integrated into the same component.

22. The receiver of claim 21, wherein said same component comprises a microprocessor.

23. A radar receiver for receiving electrical signals generated by an antenna in response to a radar wave reflected from a target, comprising:

an amplifier responsive to the signals generated by the antenna, wherein said amplifier is configured to amplify the signals from the antenna in accordance with a gain value to generate amplified signals;

an envelope detector responsive to said amplified signals from said amplifier, wherein said envelope detector is configured to detect a signal corresponding to the radar wave reflected from the target and provide a detection signal in accordance with the signal corresponding to the radar wave reflected from the target; and a processing unit responsive to said detection signal provided by said envelope detector, wherein said processing unit includes:
a gain controller connected to said amplifier configured to adjust said gain value according to an anticipated input amplitude of the radar wave reflected from the target;
a threshold generator configured to generate a threshold value according to said anticipated input amplitude of the radar wave reflected from the target, wherein said threshold generator is further configured to scale said threshold according to said gain value;
said threshold generator configured to determine said threshold value according to said anticipated input amplitude of the radar wave reflected from the target using a lookup table; and
a comparator responsive to said detection signal provided by said envelope detector, wherein said comparator is configured to compare said detection signal to said scaled threshold.

24. The receiver of claim 23, wherein said gain controller adjusts said gain value of said amplifier only to optimize a dynamic range of the receiver according to said anticipated input amplitude.

25. The receiver of claim 23, wherein said threshold generator is configured to determine a plurality of threshold values according to a plurality of possible anticipated input amplitudes of the radar wave reflected from the target, wherein said plurality of possible anticipated amplitudes corresponds to possible reflectivities of the target.

26. The receiver of claim 23, wherein said threshold generator is further configured to change said scaled threshold in accordance with a time-invariant correction factor.

27. The receiver of claim 23, wherein said gain controller adjusts said gain value of said amplifier according to said anticipated input amplitude in conjunction with a predetermined gain schedule.

* * * * *